United States Patent
Ung et al.

(10) Patent No.: US 6,588,289 B2
(45) Date of Patent: Jul. 8, 2003

(54) LINEAR ACTUATOR WITH PROTECTIVE GUIDE CHASSIS ENCLOSING THE LEAD SCREW

(75) Inventors: Tom Thang Ung, Sunnyvale, CA (US); Robert Alexander Lipsett, San Jose, CA (US)

(73) Assignee: Danaher Motion Technology, LLC, Mayfield Heights, OH (US)

( * ) Notice: Subject to any disclaimer, the term of this patent is extended or adjusted under 35 U.S.C. 154(b) by 0 days.

(21) Appl. No.: 09/900,802

(22) Filed: Jul. 6, 2001

(65) Prior Publication Data

US 2003/0005785 A1 Jan. 9, 2003

(51) Int. Cl.$^7$ ............................................... F16H 25/20
(52) U.S. Cl. ........................ 74/89.4; 74/89.33; 384/15; 384/43
(58) Field of Search ............................ 74/89.32, 89.33, 74/89.4, 566; 384/15, 43, 44, 49, 50

(56) References Cited

U.S. PATENT DOCUMENTS

| | | | | |
|---|---|---|---|---|
| 4,392,390 A | * | 7/1983 | Johnson | 74/89.4 |
| 4,512,208 A | * | 4/1985 | Lipinski et al. | 74/89.4 |
| 4,775,247 A | * | 10/1988 | Isert | 384/43 |
| 4,802,558 A | * | 2/1989 | Garnett | 318/372 |
| 5,067,823 A | * | 11/1991 | Kasuga | 384/45 |
| 5,373,751 A | * | 12/1994 | Katahira | 74/89.32 |
| 5,558,442 A | * | 9/1996 | Ng | 384/43 |
| 5,598,043 A | * | 1/1997 | Hirano et al. | 74/566 |
| 5,613,780 A | * | 3/1997 | Ng | 384/43 |
| 5,839,321 A | * | 11/1998 | Siemons | 74/89.42 |
| 5,913,941 A | * | 6/1999 | Erikson et al. | 74/424.95 |
| 5,915,916 A | * | 6/1999 | Saji | 198/468.9 |
| 5,930,898 A | * | 8/1999 | Lyon | 29/451 |
| 5,937,702 A | * | 8/1999 | Erikson et al. | 74/424.95 |
| 6,036,366 A | * | 3/2000 | Andreasson | 384/42 |
| 6,052,902 A | * | 4/2000 | Lyon | 384/55 |
| 6,241,230 B1 | * | 6/2001 | Kawaguchi | 384/15 |

* cited by examiner

Primary Examiner—William C Joyce
(74) Attorney, Agent, or Firm—James J. Leary; Carol D. Titus; Gregory Smith & Associates (57) ABSTRACT

A contamination resistant lead screw or ball screw-driven linear actuator has the lead screw and drive nut enclosed within a specially constructed guide chassis. A carriage is slidably mounted on parallel rails attached to the guide chassis. The carriage is attached to the drive nut through a slot in the guide chassis. An enclosure surrounds the guide chassis. The enclosure and the guide chassis create a labyrinth seal that effectively contains internally generated debris and contamination and excludes environmental dirt, debris and contamination.

22 Claims, 7 Drawing Sheets

LINEAR ACTUATOR WITH PROTECTIVE GUIDE CHASSIS ENCLOSING THE LEAD SCREW

FIELD OF THE INVENTION

The present invention relates generally to electromechanical linear actuators. More particularly, it relates to a lead screw-driven linear actuator having a specially constructed guide chassis that encloses the lead screw and the drive nut and protects them from dirt, debris and contamination.

BACKGROUND OF THE INVENTION

Linear actuators are used in a great many machine assemblies to provide linear motion between two parts of the machine, for example to provide linear motion between a machine base and a load. Different types of linear actuators include pneumatic cylinders, hydraulic cylinders, rodless cylinders, rack-and-pinion gears, lead screw actuators and ball screw actuators. Lead screw actuators generally have a rotatable lead screw and a drive nut that engages the helical threads of the lead screw. When the lead screw is rotated relative to the drive nut, the drive nut converts the rotary motion to linear motion. In some applications, the rotatable lead screw is held stationary and the drive nut, which is constrained from rotating, moves linearly relative to the lead screw. In other applications, the drive nut is held stationary and the rotatable lead screw moves linearly relative to the drive nut. In yet another variation, the lead screw is constrained from rotating and the drive nut is rotated to create linear motion of the lead screw.

Ball screw actuators are a special type of lead screw actuator in which the drive nut contains recirculating ball bearings that engage the helical threads of the lead screw. The recirculating ball bearings reduce the friction between the lead screw and the drive nut, providing a highly efficient conversion of rotary motion to linear motion. Lead screw actuators have many advantages including easily controlled speeds, reversibility, precise and repeatable positioning of loads, and high resistance to being backdriven by forces on the load.

Contamination resistance is important in many applications of linear actuators. For example, in a clean room environment, it is important that the mechanism of a linear actuator does not release debris that would contaminate the operating environment. Conversely, in highly contaminated environments, the mechanism of the linear actuator must be protected from environmental debris and contamination. In nearly all environments, it is desirable to protect the mechanism of the linear actuator from mechanical damage as well.

One prior art attempt to create a contamination resistant lead screw actuator is described in U.S. Pat. No. 5,915,916. This patent and all other U.S. patents referred to herein are hereby incorporated by reference in their entirety. The lead screw and drive nut are enclosed within a housing that has a slit in it. A moving carriage is attached to the drive nut through the slit. A moving seal belt, which is mounted on pulleys, attaches to the carriage and covers the portion of the slit that is not occupied by the carriage. In other prior art devices, the lead screw and drive nut or other mechanism of a linear actuator is enclosed in a U-shaped channel and telescoping or accordion-folded panels cover the open top of the channel to exclude debris and contamination. These prior art devices tend to be overly complex, expensive and subject to mechanical failure.

Current manufacturing processes for linear actuators in general, and lead screw actuators in particular, involve the use of very expensive precision manufacturing equipment and very often involve the machining and grinding of hardened steels, which both add significantly to the manufacturing costs. One main source of the expense is the production of the linear rails that are part of the guide assembly in a linear actuator. U.S. Pat. No. 6,052,902 represents one prior art attempt to reduce the complexity and expense of linear motion bearing fabrication. The fabrication method described does not go far enough in eliminating the expensive precision manufacturing processes involved in fabricating a linear actuator assembly. Thus, there is a continuing need for improvements to the current manufacturing processes for fabricating a guide assembly for use in linear actuators.

It would be desirable, therefore, to provide a contamination resistant linear actuator, particularly a lead screw actuator, that is simple, low cost to manufacture and mechanically reliable.

SUMMARY OF THE INVENTION

In keeping with the foregoing discussion, the present invention provides a contamination resistant lead screw-driven linear actuator in which the lead screw and drive nut are enclosed within a specially constructed guide chassis that protects them from dirt, debris and contamination. The guide chassis also serves to effectively contain any debris or contamination produced by the linear actuator mechanism so that it does not contaminate the operating environment of the linear actuator.

The linear actuator is constructed around a guide assembly that includes a guide chassis to which are attached a pair of parallel guide rails. A carriage is slidably mounted on the guide chassis by bearing assemblies that are supported on the parallel guide rails. One or more magnets are attached to the carriage to facilitate non-contact position sensing. A drive nut, which preferably includes an anti-backlash mechanism, is driven back and forth by a lead screw, which is in turn driven by a reversible electric motor. The lead screw and the drive nut are enclosed within an approximately cylindrical central passage within the guide chassis. A narrow slot through the wall of the guide chassis extends along the length of the central passage. The drive nut is attached to the carriage through the slot in the guide chassis by a nut flange. The slot in the guide chassis is preferably angled downward away from the top of the guide assembly where the carriage is mounted. This configuration helps to resist environmental debris from entering the central passage and contaminating the lead screw and drive nut.

The linear actuator has an enclosure that includes a side cover plates and an end cover plate, which cover the sides and end of the guide subassembly, and a molded plastic motor housing, which covers the electric motor. Hall effect position sensors are repositionably mounted on the exterior of the enclosure to sense the position of the carriage. The enclosure, together with the guide chassis, creates a labyrinth seal that effectively contains internally generated debris and contamination and excludes environmental dirt, debris and contamination.

In a preferred embodiment, the linear actuator is provided as a fully assembled integrated module ready to install for a variety of linear motion applications. In a typical application, the guide chassis of the linear actuator is affixed to a base, such as a work surface or a machine, and a load, which may be a mechanical or electromechanical device, a tool, a fixture, an optical component, etc., is mounted on the carriage of the linear actuator. The carriage is driven back and forth along the length of the parallel guide rails by the electric motor to position the load with respect to the linear actuator.

The present invention also provides an improved method of manufacturing a screw-driven linear actuator.

DETAILED DESCRIPTION OF THE INVENTION

Figure 1:
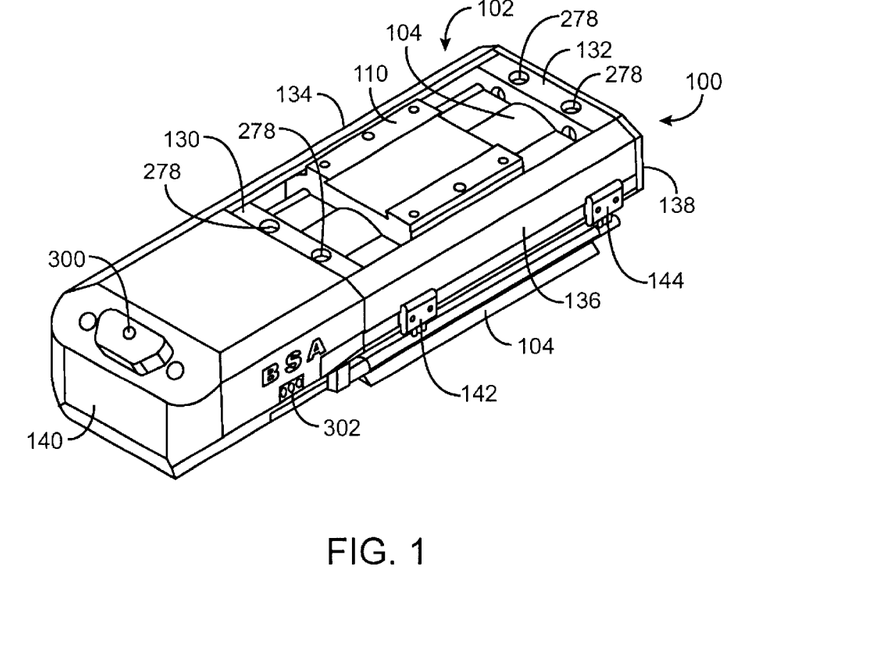
FIG. 1 is a perspective view of a linear actuator constructed in accordance with the principles of the present invention.
Figure 2:
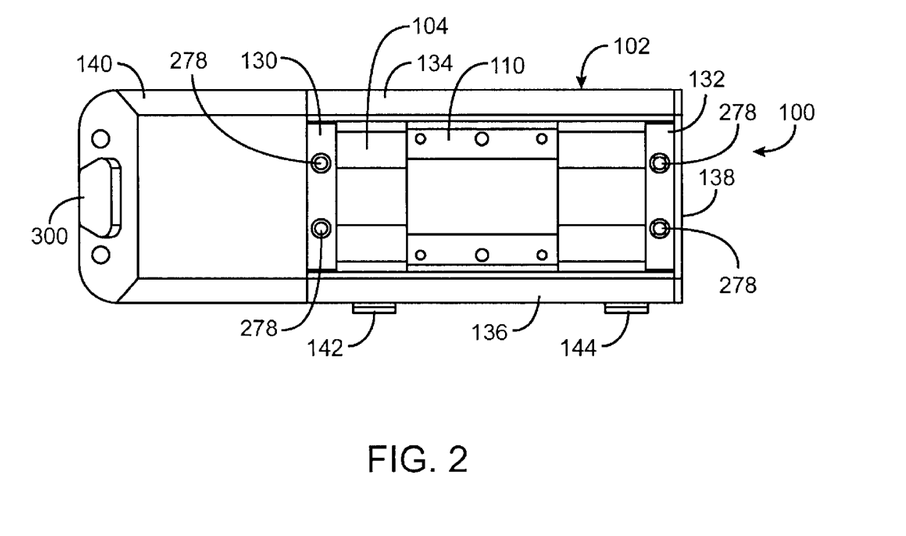
FIG. 2 is a top view of the linear actuator of FIG. 1.
Figure 3:
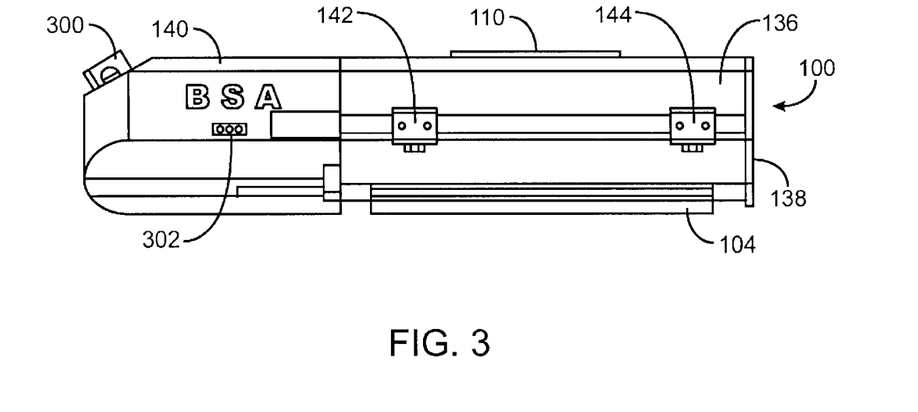
FIG. 3 is a side view of the linear actuator of FIG. 1.
Figure 4:
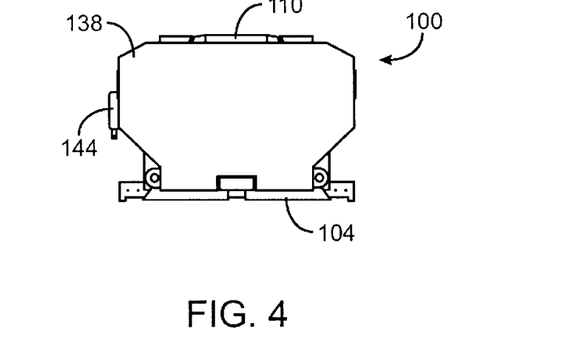
FIG. 4 is an end view of the linear actuator of FIG. 1.
Figure 5:
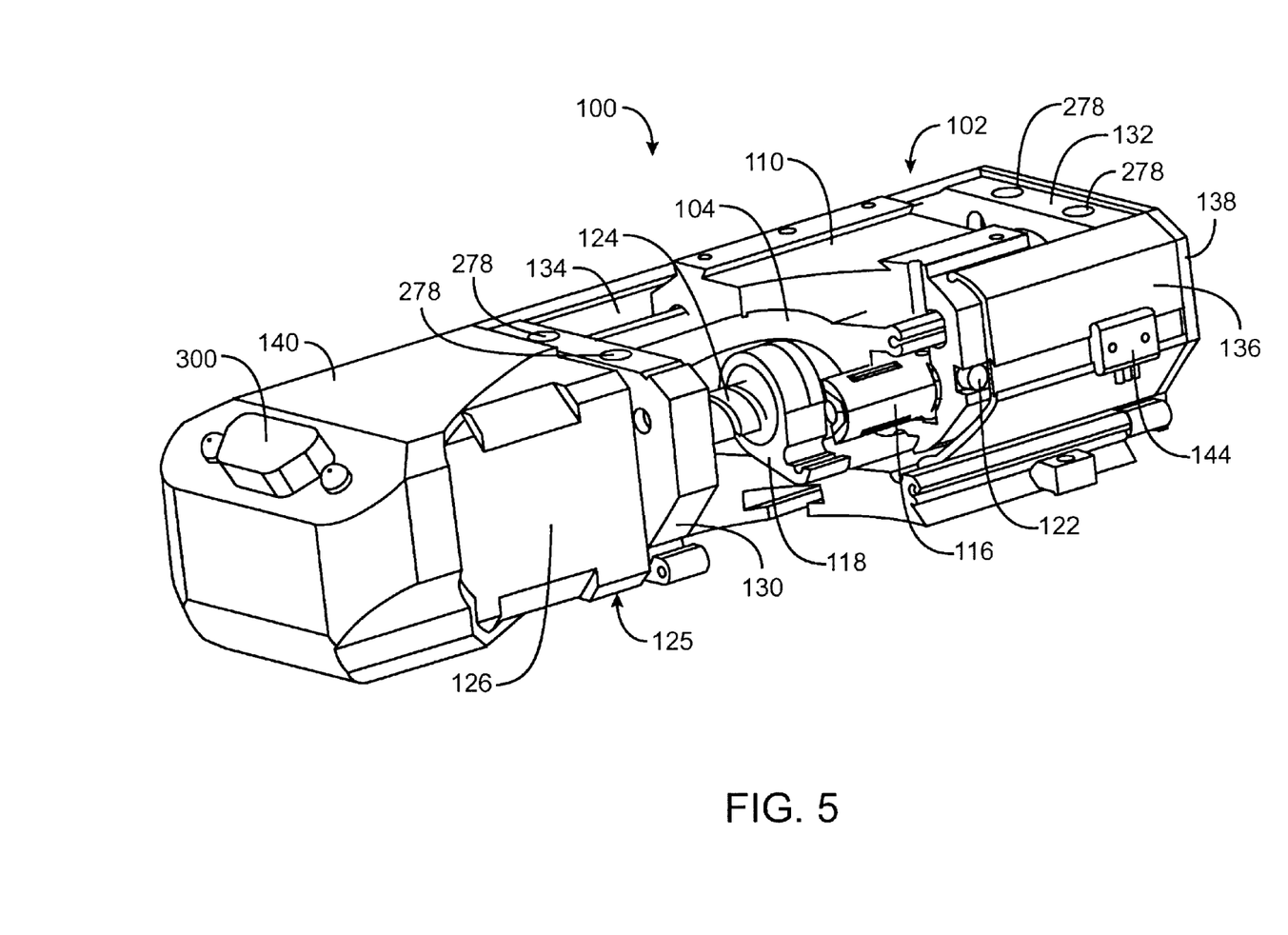
FIG. 5 is a cutaway perspective view of the linear actuator showing the internal components.

FIG. 1 is a perspective view of a fully assembled linear actuator 100 constructed in accordance with the principles of the present invention. FIG. 2 is a top view, FIG. 3 is a side view and FIG. 4 is an end view of the linear actuator 100 of FIG. 1. FIG. 5 is a cutaway perspective view showing the internal components of the linear actuator 100. The components of the linear actuator 100 are shown in an exploded view in FIG. 6. At the heart of the linear actuator 100 is the guide assembly 102. The components of the guide subassembly 102 are shown in an exploded view in FIG. 7. The guide subassembly 102 includes a guide chassis 104 to which are attached a first guide rail 106 and a second guide rail 108. Alternatively, the guide rails 106, 108 may be formed integrally with the guide chassis 104. A carriage 110 is slidably mounted on the guide chassis 104. The carriage 110 is supported on the parallel guide rails 106 and 108 by a first bearing assembly 112 and a second bearing assembly 114. The bearing assemblies 112, 114 may be configured as recirculating-ball linear bearings or, alternatively, sliding bearings may be used. A drive nut 116, which in a preferred embodiment includes an anti-backlash mechanism as described in U.S. Pat. No. 5,839,321, is attached to the carriage 110 by a nut flange 118. A first magnet 120 and a second magnet 122 are attached to the carriage 110. The guide subassembly 102 is terminated on one end by a first end plate 130 and on the other end by a second end plate 132. Mounting holes 278 are drilled in each of the first and second end plates 130, 132. The mounting holes 278 provide a standardized way of mounting the linear actuator to a work surface.

Figure 6:
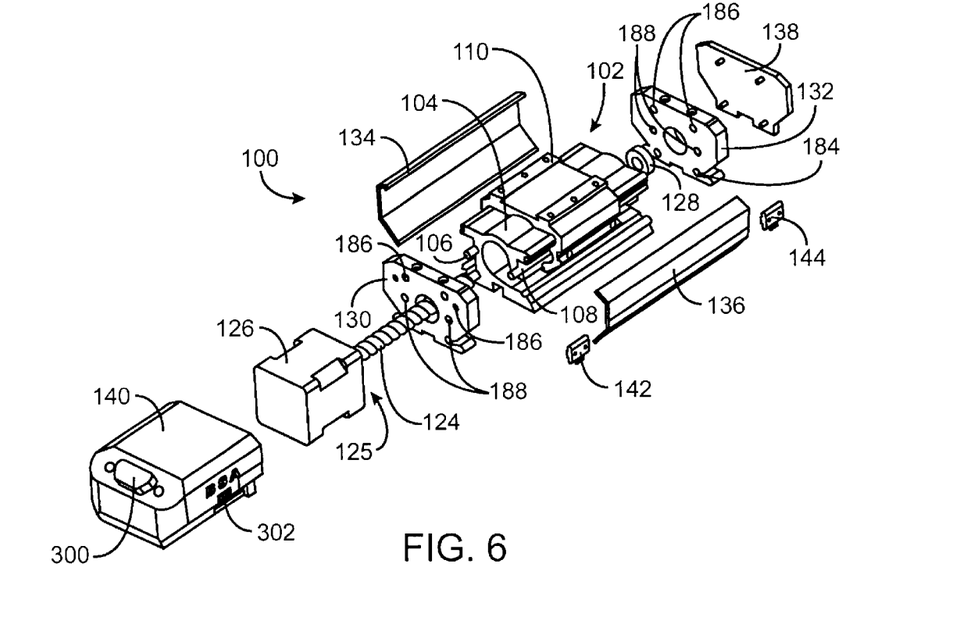
FIG. 6 is an exploded view of the linear actuator.
Figure 7:
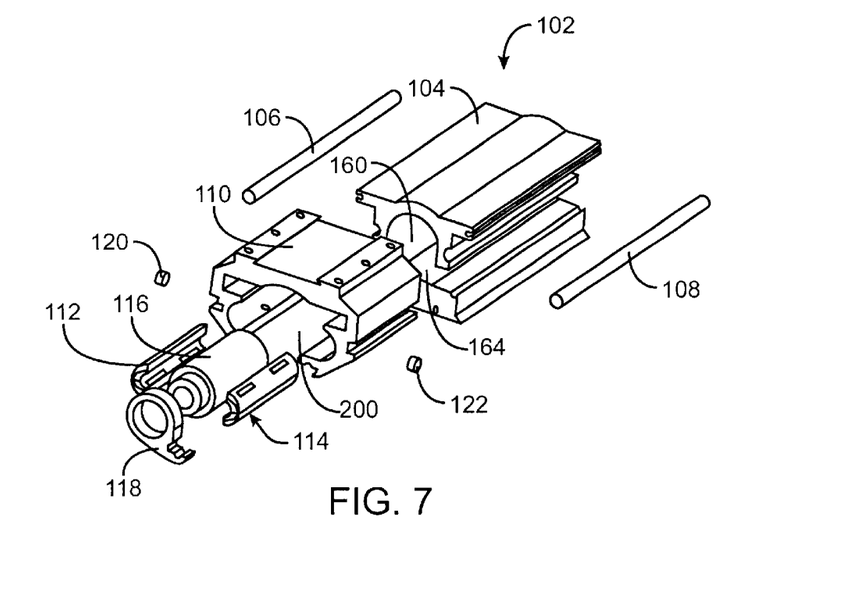
FIG. 7 is an exploded view of the guide subassembly of the linear actuator.

The drive nut 116 is driven back and forth by a lead screw 124, which is in turn driven by a reversible electric motor 126. In a preferred embodiment, the drive nut 116 and the lead screw 124 are configured as a ball screw actuator in which the drive nut 116 contains recirculating ball bearings that engage the helical threads of the lead screw 124. The electric motor 126 is attached to the first end plate 130 and the end of the lead screw 124 is supported by a radial bearing 128 mounted in the second end plate 132. In a preferred embodiment, the electric motor 126 is a stepper motor with an integrated motor driver, such as a NEMA 17 stepper motor, which provides precise control over the position of the carriage 110 along the length of the guide chassis 104. Alternatively, a separate motor driver for the electric motor 126 may be provided as part of linear actuator 100 or separate from it. In other embodiments, another type of AC or DC reversible electric motor could be used in place of the stepper motor.

In a preferred embodiment, the electric motor 126 and lead screw 124 are permanently joined together to form a unitary or integral motor-lead screw assembly 125. The integral motor-lead screw assembly 125 is constructed by forming a hole in the rotor of the electric motor 126 to receive the lead screw 126 and forming a short cylindrical stub at one end of the lead screw 126 to mate with the hole in the rotor by means of a clearance fit. A bonding agent or cement is applied to the hole and/or the stub and the stub is inserted into the hole in the rotor. Once the bonding agent or cement has cured, the electric motor 126 and lead screw 124 are permanently joined together to form an integral motor-lead screw assembly 125. This arrangement decreases the overall length of the motor-lead screw assembly 125, while providing direct-drive performance. It also simplifies the construction of the linear actuator 100 by eliminating the need for separate motor mounts and flexible couplings.

The linear actuator 100 is completed with a first side cover plate 134, a second side cover plate 136 and an end cover plate 138, which cover the sides and end of the guide subassembly 102, and a molded plastic motor housing 140, which covers the electric motor 126. A first Hall effect sensor 142 and a second Hall effect sensor 144 are repositionably mounted on the second side cover plate 136. In a preferred embodiment, all of the electrical connections for the linear actuator 100 are centralized in a single communications port 300 mounted on the exterior of the motor housing 140. In addition, one or more sensor input ports 302 are provided for making connections with the Hall effect sensors 142, 144.

In a preferred embodiment, the linear actuator 100 is provided to the user as a fully assembled integrated module ready to install for a variety of linear motion applications. In a typical application, the guide chassis 104 of the linear actuator 100 is affixed to a base, such as a work surface or a machine, and a load, which may be a mechanical or electromechanical device, a tool, a fixture, an optical component, etc., is mounted on the carriage 110 of the linear actuator 100. The carriage 110 is driven back and forth along the length of the parallel guide rails 106 and 108 by the electric motor 126 to position the load with respect to the linear actuator 100.

Figure 8:
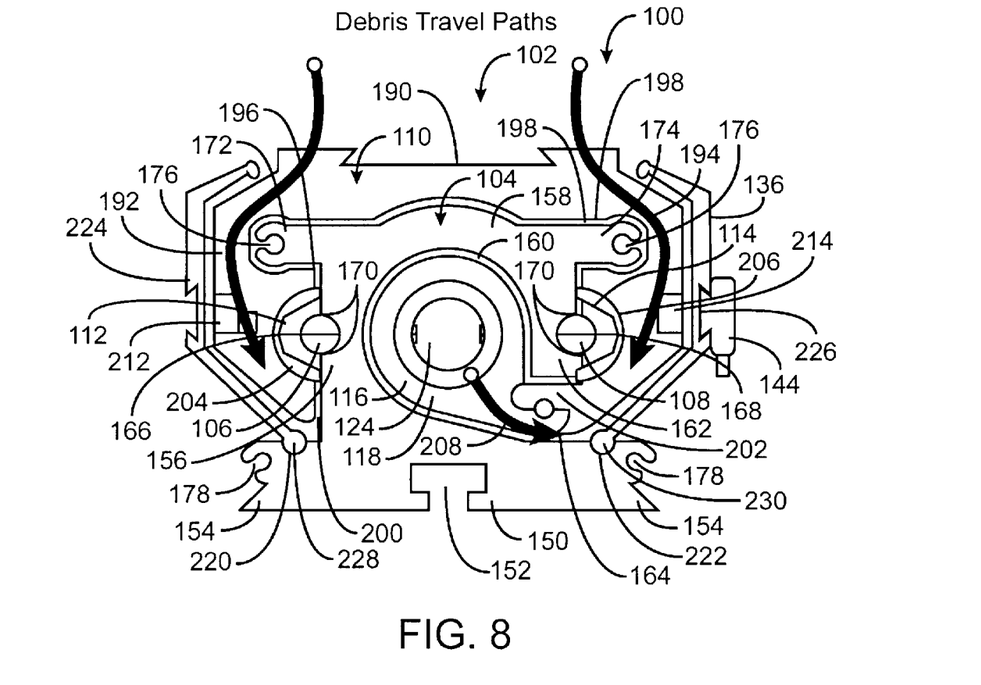
FIG. 8 is an end view of the guide assembly of the linear actuator.

FIG. 8 is an end view of the guide assembly 102 of the linear actuator 100 with the first side cover plate 134 and second side cover plate 136 installed. In this view, the cross-sectional profile of the guide chassis 104 and the carriage 110 can be clearly seen. The guide chassis 104 has a base 150 that is shaped to facilitate alternative mounting options. The base 150 has dovetail shaped lateral edges 154 to facilitate inserting the base 150 into a dovetail slot or for clamping the linear actuator 100 down to a base. A T-shaped slot 152 is also provided in the center of the base 150 to facilitate clamping the linear actuator 100 down to a base. The guide chassis 104 is formed around an approximately cylindrical central passage 160 with a first vertical side wall 156 that extends upward from the base 150, an approximately horizontal upper wall 158 extending from the top of the first side wall 156 and a second vertical side wall 162 depending from the upper wall 158, leaving a gap or slot 164 connecting with the central passage 160 between the second side wall 162 and the base 150. Thus, the lead screw 124 and the drive nut 116 are effectively enclosed within the central passage 160 of the guide chassis 104. The slot 164 in the guide chassis 104 is preferably angled downward away from the top of the guide assembly 102 where the carriage 110 is mounted. In a preferred embodiment, the slot 164 is located on the guide chassis 104 below the second guide rail 108 and angled downward away from the top of the guide assembly 102 at an angle from approximately 90 to 180 degrees. This configuration helps to resist environmental debris from entering the central passage 160 and contaminating the lead screw 124 and drive nut 116.

A first approximately semicircular channel 166 is formed in the first side wall 156 to receive the first guide rail 106. A second approximately semicircular channel 168 is formed parallel to the first semicircular channel 166 in the depending second side wall 162 to receive the second guide rail 108. The first and second guide rails 106, 108 are preferably made from cylindrical steel rods, for example from 5 mm diameter steel rods.

In a preferred embodiment, the first and second semicircular channels 166, 168 are formed with crush zones 170 that deform so that the rails 106, 108 can be press fit into the semicircular channels 166, 168. The crush zones 170 are areas along the length of the guide chassis 104 where the material is designed to be weaker than the surrounding material to allow for controlled deformation of the material in the crush zones 170 as the rails 106, 108 are pressed into the semicircular channels 166, 168. Alternatively or in addition, a bonding agent, such as adhesive or cement, may be used to bond the rails 106, 108 into the semicircular channels 166, 168 and/or to fill in any gaps in the assembly.

Compared to conventional guide rail fabrication processes, the use of crush zones 170 can reduce the overall cost of manufacturing and assembly, without loss in precision. Predefined failure points, i.e. crush zones 170, allow for controlled positioning and alignment of the rails 106, 108 without requiring the channels 166, 168 to be precision machined or ground, as is done in the conventional fabrication process. Additionally, a relatively low cost linear extrusion can be utilized rather than a machined part for fabricating the guide chassis 104. These attributes of the crush zones 170 can significantly reduce the overall cost of manufacturing and assembly of the linear actuator 100, while maintaining the precise alignment of the linear rails 106, 108 that contributes to smooth operation.

Optionally, the guide chassis 104 may also include a first upper flange 172 and a second upper flange 174 that extend laterally from the edges of the horizontal upper wall 158. The first and second upper flanges 172, 174 cover the guide rails 106, 108 and shield them from debris and contamination. Slotted holes 176, which are sized to accept self-tapping screws, are formed in the ends of the first and second upper flanges 172, 174. Similarly, slotted holes 178 for self-tapping screws are also formed near the lateral edges 154 of the base 150. Corresponding holes 186, 188 are provided in each of the end plates 130, 132 for attaching the end plates 130, 132 to the guide chassis 104 with self-tapping screws (see FIG. 6.)

The carriage 110 has a shape that conforms closely to the upper part of the guide chassis 104. The carriage 110 has a horizontal upper surface 190 that is connected to a first depending vertical leg 192 and a second depending vertical leg 194. A dovetail slot 182 is formed in the upper surface 190 as one means of attaching a load to the carriage 110. The first and second depending vertical legs 192, 194 are spaced apart to form an internal channel 200 that is sized and shaped to slide telescopically over the upper part of the guide chassis 104. If the guide chassis 104 is constructed with first and second upper flanges 172, 174 as shown, then corresponding slots 196, 198 are formed in the first and second depending vertical legs 192, 194 to provide clearance for the flanges 172, 174. A tongue 202 extends from the second depending vertical leg 194 through the slot 164 between the second side wall 162 and the base 150 of the guide chassis 104. The tongue 202 is configured to interlock with an arm 208 extending from the nut flange 118 without the need for any additional fasteners. This arrangement effectively attaches the carriage 104 to the drive nut 116. In another preferred embodiment, the nut flange 118 is integrated into the tongue 202, thereby reducing the part count. Alternatively, one or more screws or other fasteners may be used to secure the tongue 202 that extends from the second depending vertical leg 194 of the carriage 104 to the arm 208 that extends from the nut flange 118.

A first internal semicircular channel 204 is formed in the first depending vertical leg 192 to hold the first bearing assembly 112 in alignment with the first guide rail 106 and a second internal semicircular channel 206 is formed in the second depending vertical leg 194 to hold the second bearing assembly 114 in alignment with the second guide rail 108. First and second external slots 212, 214 are formed in the first and second depending vertical legs 192, 194, respectively, to receive the first and second magnets 120, 122 (see FIG. 7.)

In a preferred embodiment, the guide chassis 104 is made from aluminum and extruded with the cross-sectional profile shown, the extrusion is cut to length to produce the final part. Similarly, the carriage 110 is made from aluminum and extruded with the cross-sectional profile shown, the extrusion is cut to length and the holes are drilled in a single operation to produce the final part. This minimizes the amount of machining necessary to produce these parts. It also reduces the inventory of parts needed to produce different sizes of linear actuators 100 with a range of stroke lengths. The guide chassis material can be stocked in as-extruded lengths and the extrusion cut to length to produce a guide chassis 104 with any desired stroke length. Typically, the guide chassis 104 will be sized to provide a linear actuator 100 with a stroke length of approximately 100 mm to 600 mm, but virtually any stroke length is possible with this manufacturing technique.

Preferably, the first and second side cover plates 134, 136 are also made from an aluminum extrusion and cut to length. Dovetail slots 224, 226 are formed in the first and second side cover plates 134, 136 for mounting the first and second Hall effect sensors 142, 144. Because of their symmetry, the first and second side cover plates 134, 136 may be made from a single aluminum extrusion. Slots 184 are provided in the first and second end plates 130, 132 to hold the first and second side cover plates 134, 136 in place (see FIG. 6.) Bosses 228, 230 on the lower edges of the first and second side cover plates 134, 136 interlock with the slots 184 in the first and second end plates 130, 132. Grooves 220, 222 may be provided on each side of the base 150 of the guide chassis 104 for alignment of the first and second side cover plates 134, 136 when the linear actuator 100 is assembled.

It can be readily seen from FIG. 8 that the hollow configuration of the guide chassis 104 substantially encloses the lead screw 124 and the drive nut 116. This protects these components from dirt, debris and contamination. The first and second side cover plates 134, 136 along with the first and second upper flanges 172, 174 of the guide chassis 104 provide additional protection by effectively creating a labyrinth seal with a long path length that prevents dirt, debris and contamination from entering the central passage 160 of the guide chassis 104. In addition, the guide rails 106, 108 and the bearing subassemblies 112, 114 are protected from dirt, debris and contamination. This advantage is important for operating the linear actuator 100 in dirty environments where dirt, debris and contamination could damage an unprotected lead screw linear actuator. Furthermore, the configuration of the linear actuator 100 also prevents oil, grease or debris originating from within the linear actuator 100 from escaping and contaminating the environment.

This advantage is important for operating the linear actuator 100 in clean environments where contamination from within the linear actuator 100 would be undesirable.

Figure 9:
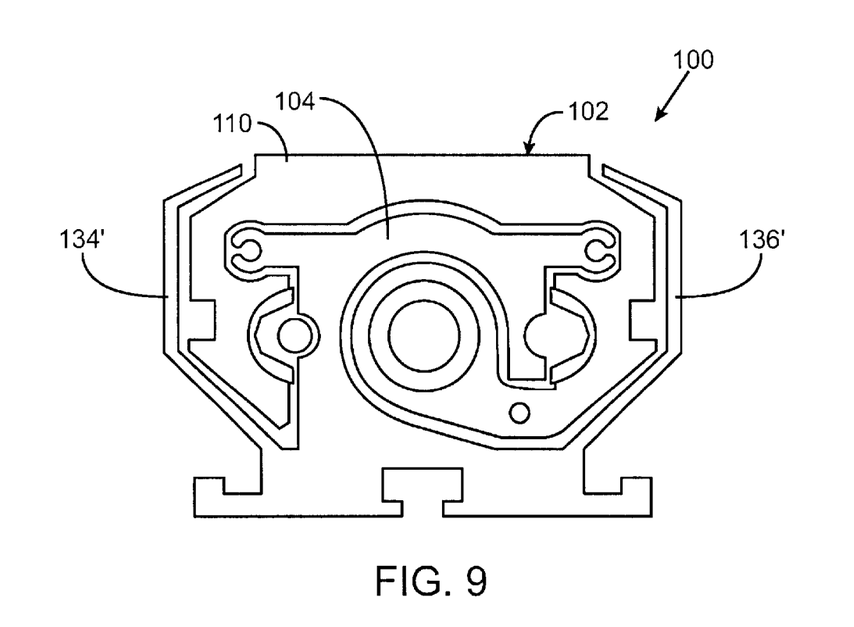
FIG. 9 is a cross section of an alternate embodiment of the linear actuator with integral side covers.

In an alternate embodiment shown in FIG. 9, the linear actuator 100 may be made with side covers 134', 136' that are integral to the guide chassis 104.

Figure 10:
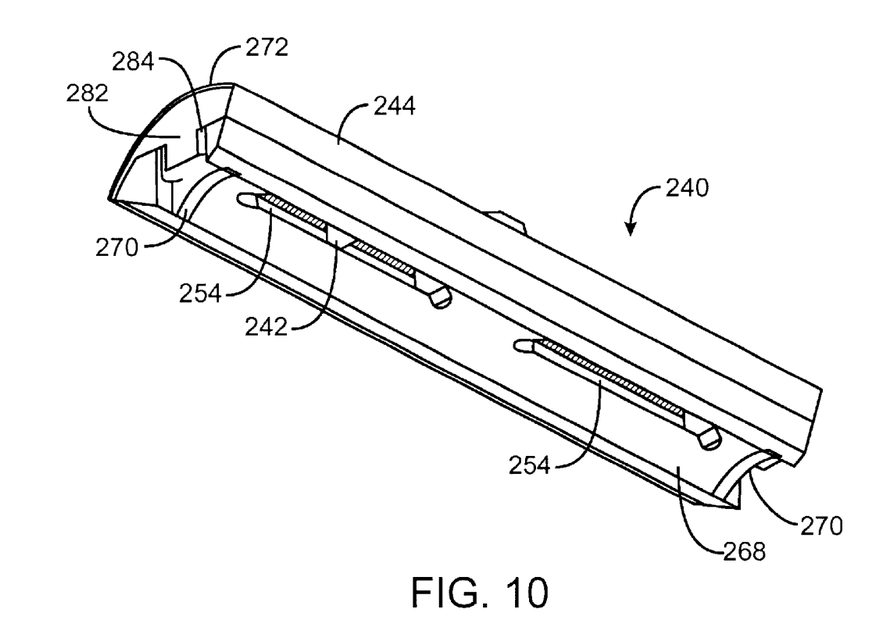
FIG. 10 is a perspective view of a recirculating-ball linear bearing used in the linear actuator.
Figure 11:
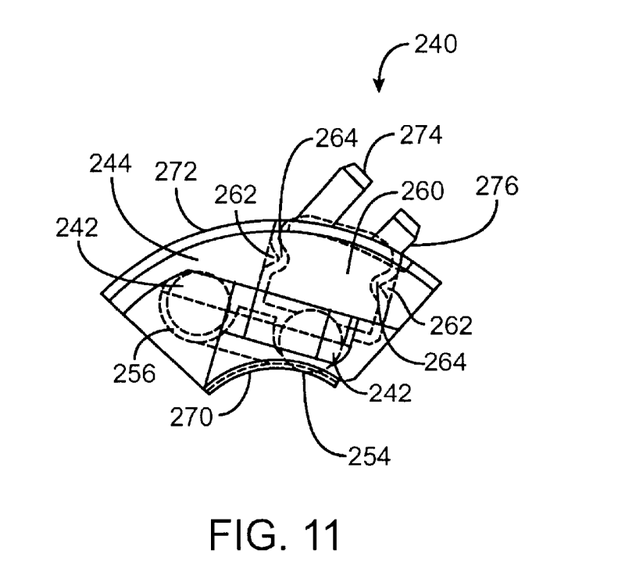
FIG. 11 is an end view of the recirculating-ball linear bearing.
Figure 12:
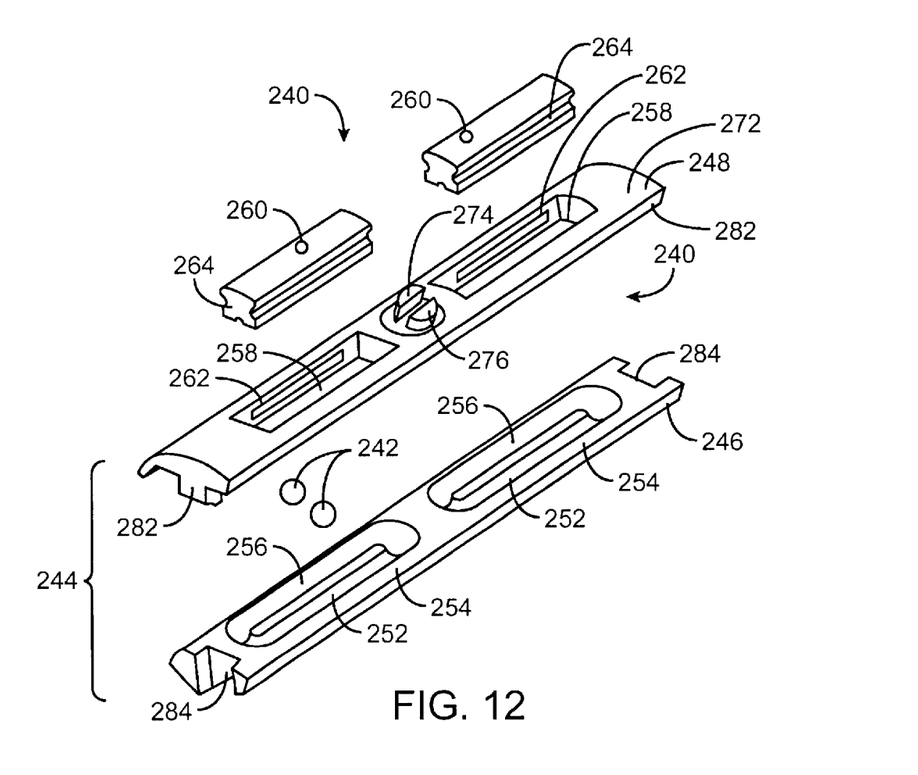
FIG. 12 is an exploded view of the recirculating-ball linear bearing.

FIG. 10 is a perspective view of a recirculating-ball linear bearing 240 used in the linear actuator of the present invention. FIG. 11 is an end view of the recirculating-ball linear bearing 240 and FIG. 12 is an exploded view of the recirculating-ball linear bearing 240. The recirculating-ball linear bearing 240 utilizes a plurality of ball bearings 242 enclosed within a ball retainer 244. The ball retainer 244 is preferably injection molded of plastic with an inner portion 246 and an outer portion 248. A tongue 282 protruding from each end of the outer portion 248 forms a nesting joint with a corresponding slot 284 on each end of the inner portion 246 to hold the ball retainer 244 together. The inner portion 246 of the ball retainer 244 has two elongated oval tracks 252 molded within it. In one preferred embodiment, there are 19 ball bearings 242 enclosed within each track of the 252 ball retainer 244. On one side of each elongated oval track 252, an open slot 254 allows the ball bearings 242 to protrude from the ball retainer 244 and contact the rail guide 106 or 108. The opposite side 256 of each elongated oval track 252 is closed to prevent the ball bearings 242 from contacting any bearing surfaces as they recirculate to the open slot 254. Openings 258 in the outer portion 248 of the ball retainer 244 are configured to receive load bearing plates 260. The load bearing plates 260 are preferably made of stainless steel or another hard material. Ridges 262 molded along the inside edges of the openings 258 engage grooves 264 in the load bearing plates 260 and retain them in place.

The inner portion 246 of the ball retainer 244 is molded with a concave inner surface 268 with a radius of curvature slightly larger than the radius of curvature of the guide rails 106, 108 to provide a small amount of radial clearance. A pair of wipers 270 having a radius of curvature approximately the same as the radius of curvature of the guide rails 106, 108 that protrude from the inner surface 268 are molded integrally with the inner portion 246 of the ball retainer 244 and serve to capture lubricating grease within the linear bearing 240 and prevent dirt and debris from entering the linear bearing 240.

The outer portion 248 of the ball retainer 244 is molded with a convex outer surface 272 with a radius of curvature approximately the same as the radius of curvature of the internal semicircular channels 204, 206 in the carriage 110. Flexible protrusions 274, 276 protrude from the outer surface 272 to retain the recirculating-ball linear bearing 240 in the internal semicircular channels 204, 206 in the carriage 110.

Figure 13:
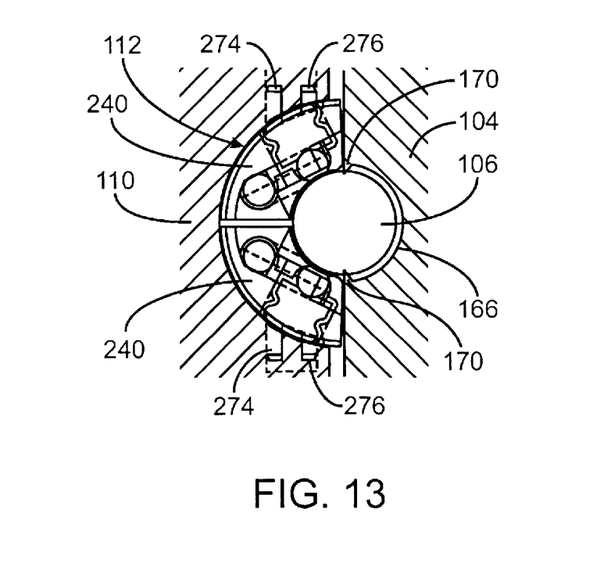
FIG. 13 shows two recirculating-ball linear bearings installed in the linear actuator.

As described above in connection with FIG. 7, the preferred embodiment of the linear actuator 100 utilizes two bearing assemblies 112, 114 to support the carriage 110 on the parallel guide rails 106, 108. Each bearing assembly 112, 114 utilizes two recirculating-ball linear bearings 240 with two tracks 252 containing ball bearings 242 in each one. FIG. 13 shows a bearing assembly 112 with the two recirculating-ball linear bearings 240 installed within the first internal semicircular channel 204 in the first depending vertical leg 192 of the carriage 110. The bearing assembly 112 encompasses slightly less than half of the guide rod 106. The ball bearings 242 protruding through the open slots 254 in the ball retainers 244 bear against the surface of the guide rail 106. The load bearing plates 260 transfer the force from the ball bearings 242 to the carriage 110. The bearing assemblies 112, 114 allow the carriage 110 to move along the guide rails 106 with relatively little resistance, but the bearing assemblies 112, 114 effectively resist vertical and lateral forces on the carriage 110.

While the present invention has been described herein with respect to the exemplary embodiments and the best mode for practicing the invention, it will be apparent to one of ordinary skill in the art that many modifications, improvements and subcombinations of the various embodiments, adaptations and variations can be made to the invention without departing from the spirit and scope thereof.

What is claimed is:

1. A linear actuator comprising:
   a lead screw;
   a drive nut engaging said lead screw;
   a hollow linear guide chassis having a central passage substantially surrounding said lead screw and said drive nut and providing a barrier to debris and contamination;
   a carriage slidable on said guide chassis, said carriage being connected to said drive nut through a narrow slot in said guide chassis, said slot being oriented at an angle such that the lead screw is shielded from debris; and
   a first side cover plate and a second side cover plate configured to cover at least a first side and a second side of said guide chassis and said slot in said guide chassis, thereby creating a labyrinth seal as a further barrier to debris and contamination.

2. The linear actuator of claim 1, further comprising:
   a reversible motor connected to said lead screw.

3. The linear actuator of claim 1, further comprising:
   a first guide rail and a second guide rail attached to said guide chassis, said first guide rail being parallel to said second guide rail; and
   a first linear bearing and a second linear bearing attached to said carriage, said first linear bearing and said second linear bearing slidably engaging said first guide rail and said second guide rail, respectively.

4. The linear actuator of claim 3, wherein said first guide rail is supported in a first approximately semicircular channel on a first side of said guide chassis and said second guide rail is supported in a second approximately semicircular channel on a second side of said guide chassis.

5. The linear actuator of claim 4, wherein said first guide rail is attached to said guide chassis by pressing said first guide rail into said first approximately semicircular channel and deforming a first crush zone of deformable material adjacent to said first approximately semicircular channel, and wherein said second guide rail is attached to said guide chassis by pressing said second guide rail into said second approximately semicircular channel and deforming a second crush zone of deformable material adjacent to said second approximately semicircular channel.

6. The linear actuator of claim 3, wherein said first linear bearing and said second linear bearing comprise recirculating-ball linear bearings.

7. The linear actuator of claim 1, wherein said drive nut comprise recirculating-ball drive nut.

8. The linear actuator of claim 1, wherein said guide chassis further comprises an upper flange that further contributes to the labyrinth seal.

9. A linear actuator comprising:
   a lead screw;
   a drive nut engaging said lead screw;
   a hollow linear guide chassis having a central passage substantially surrounding said lead screw and said drive nut and providing a barrier to debris and contamination;
   a carriage slidable on said guide chassis, said carriage being connected to said drive nut through a narrow slot in said guide chassis, said slot being oriented at an angle such that the lead screw is shielded from debris; and
   an enclosure configured to substantially enclose said guide chassis and to cover said slot in said guide chassis, thereby creating a labyrinth seal as a further barrier to debris and contamination.

10. The linear actuator of claim 9, further comprising:
   a first guide rail and a second guide rail attached to said guide chassis, said first guide rail being parallel to said second guide rail; and
   a first linear bearing and a second linear bearing attached to said carriage, said first linear bearing and said second linear bearing slidably engaging said first guide rail and said second guide rail, respectively.

11. The linear actuator of claim 10, wherein said first guide rail is supported in a first approximately semicircular channel on a first side of said guide chassis and said second guide rail is supported in a second approximately semicircular channel on a second side of said guide chassis.

12. The linear actuator of claim 11, wherein said first guide rail is attached to said guide chassis by pressing said first guide rail into said first approximately semicircular channel and deforming a first crush zone of deformable material adjacent to said first approximately semicircular channel, and wherein said second guide rail is attached to said guide chassis by pressing said second guide rail into said second approximately semicircular channel and deforming a second crush zone of deformable material adjacent to said second approximately semicircular channel.

13. A linear actuator comprising:
   a hollow linear guide chassis having a base, a first vertical wall extending upward from said base, a horizontal wall extending laterally from the top of said first vertical wall, a second vertical wall depending downward from said horizontal wall, a central passage within said guide chassis surrounded by said base, said first vertical wall, said horizontal wall and said depending second horizontal wall, a narrow gap between said base and said depending second horizontal wall connecting to said central passage;
   a first guide rail attached to an exterior surface of said first vertical wall of said guide chassis;
   a second guide rail attached to an exterior surface of said second depending vertical wall of said guide chassis, said first guide rail being parallel to said second guide rail;
   a carriage slidably mounted on said guide chassis, said carriage having a horizontal upper surface, a first depending leg extending downward from a first end of said horizontal upper surface, and a second depending leg extending downward from a second end of said horizontal upper surface;
   a first linear bearing attached to an interior surface of said first depending leg of said carriage, said first linear bearing slidably engaging said first guide rail;
   a second linear bearing attached to an interior surface of said second depending leg of said carriage, said second linear bearing slidably engaging said second guide rail;
   a lead screw, said lead screw substantially enclosed within said central passage of said guide chassis; and
   a drive nut engaging said lead screw, said drive nut substantially enclosed within said central passage of said guide chassis, said drive nut being connected to said carriage through said narrow gap between said base and said depending second horizontal wall of said guide chassis.

14. The linear actuator of claim 13, wherein said first guide rail is supported in a first approximately semicircular channel on said first vertical wall of said guide chassis and said second guide rail is supported in a second approximately semicircular channel on said second vertical wall of said guide chassis.

15. The linear actuator of claim 14, wherein said first guide rail is attached to said guide chassis by pressing said first guide rail into said first approximately semicircular channel and deforming a first crush zone of deformable material adjacent to said first approximately semicircular channel, and wherein said second guide rail is attached to said guide chassis by pressing said second guide rail into said second approximately semicircular channel and deforming a second crush zone of deformable material adjacent to said second approximately semicircular channel.

16. The linear actuator of claim 13, wherein said first linear bearing and said second linear bearing comprise recirculating-ball linear bearings.

17. The linear actuator of claim 13, wherein said drive nut comprise recirculating-ball drive nut.

18. The linear actuator of claim 13, further comprising:
   an enclosure configured to substantially enclose said guide chassis and to cover said narrow gap between said base and said depending second horizontal wall of said guide chassis, thereby creating a labyrinth seal as a barrier to debris and contamination.

19. The linear actuator of claim 13, further comprising:
   a first side cover plate and a second side cover plate configured to cover at least a first side and a second side of said guide chassis and said narrow gap between said base and said depending second horizontal wall of said guide chassis, thereby creating a labyrinth seal as a barrier to debris and contamination.

20. The linear actuator of claim 19, wherein said guide chassis further comprises an upper flange extending laterally near the top of said first vertical wall and said second vertical wall that further contributes to the labyrinth seal.

21. The linear actuator of claim 13, wherein said guide chassis is made from an extruded profile having a substantially constant cross-sectional profile along its length.

22. The linear actuator of claim 13, wherein said carriage is made from an extruded profile having a substantially constant cross-sectional profile along its length.

* * * * *